B. F. & C. W. HILTON.
HAY PRESS.
APPLICATION FILED OCT. 30, 1916.
1,231,354.
Patented June 26, 1917.
3 SHEETS—SHEET 1.
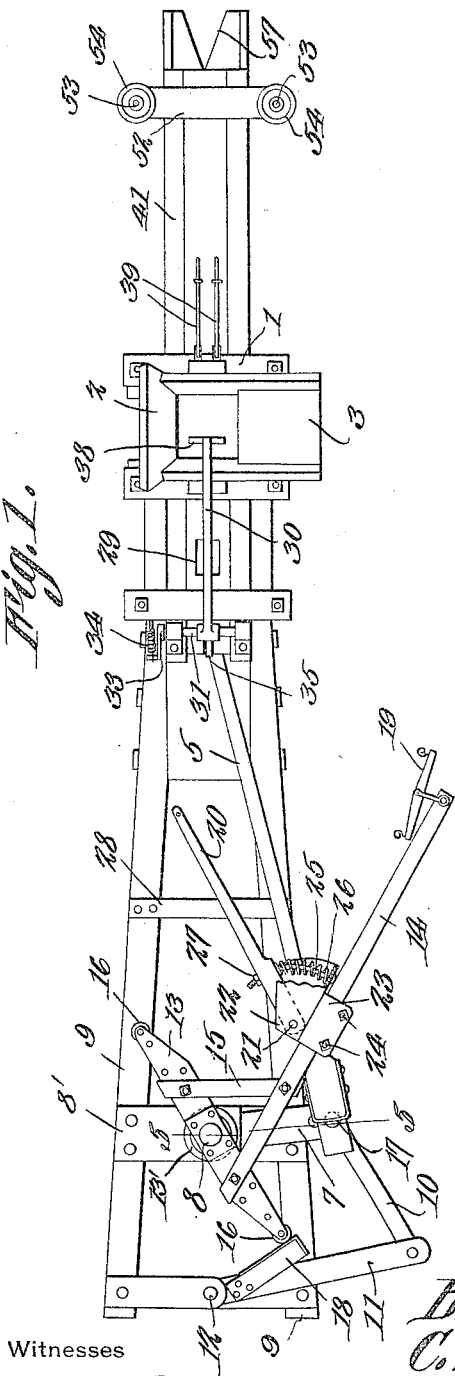
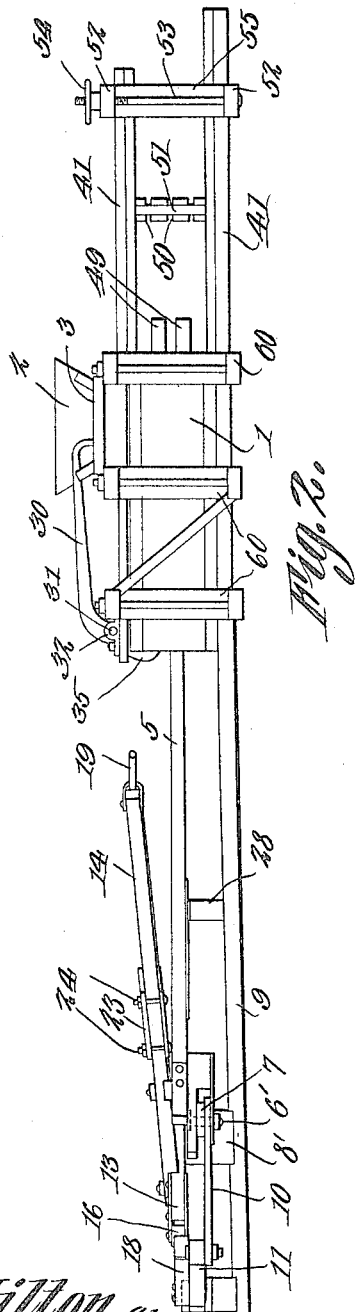
Witnesses
JR Finley
RL Parker.
B. F. Hilton and
C. W. Hilton
Inventors,
by C. A. Snow & Co.
Attorneys.

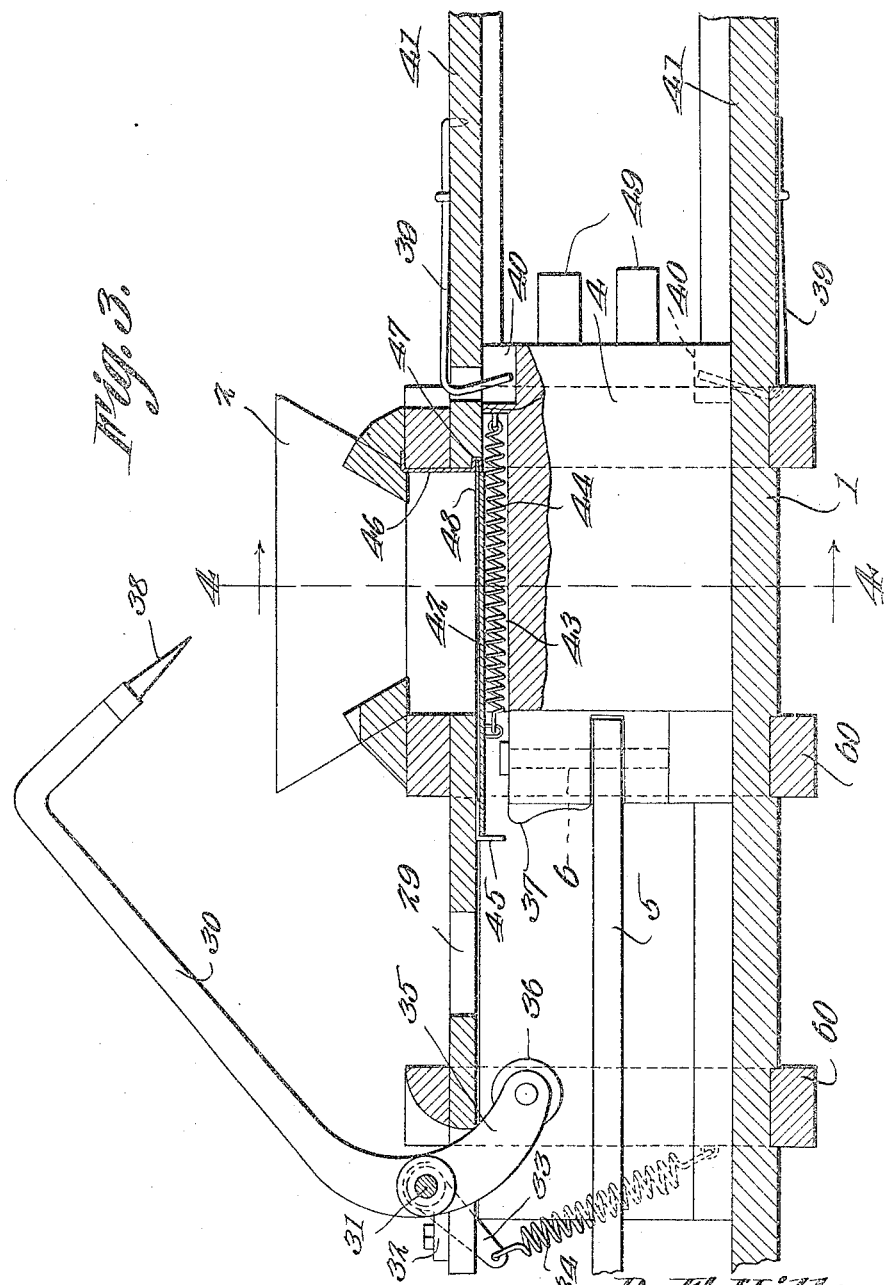

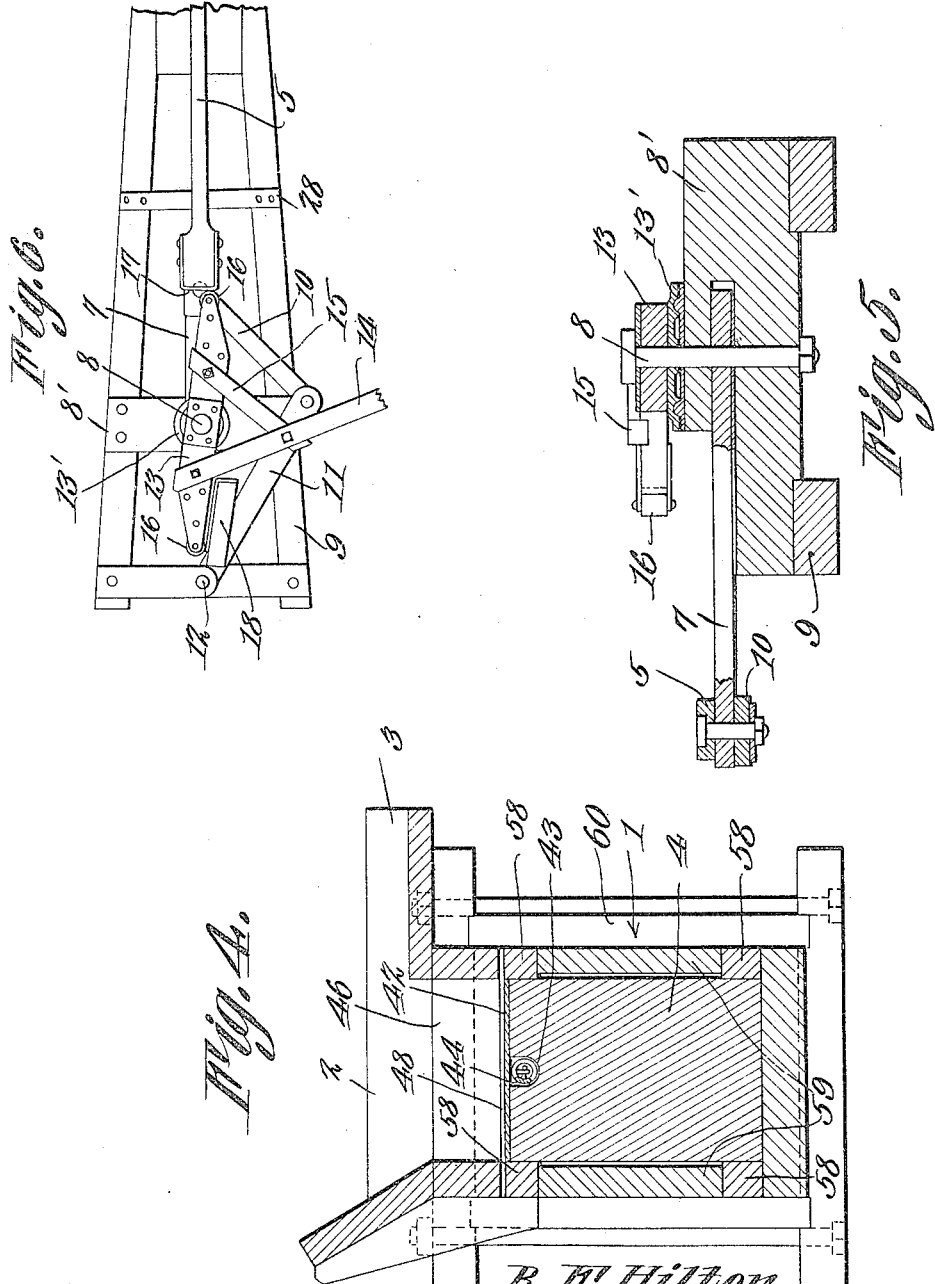

UNITED STATES PATENT OFFICE.

BEN F. HILTON AND CHARLEY W. HILTON, OF JOAQUIN, TEXAS.

HAY-PRESS.

1,231,354.  Specification of Letters Patent.  Patented June 26, 1917.

Application filed October 30, 1916. Serial No. 128,525.

*To all whom it may concern:*

Be it known that we, BEN F. HILTON and CHARLEY W. HILTON, citizens of the United States, residing at Joaquin, in the county of Shelby, State of Texas, have invented a new and useful Hay-Press, of which the following is a specification.

The present invention appertains to hay presses, and aims to provide a novel and improved press for baling hay and other similar material.

One of the objects of the invention is to provide a knock-down hay press, the parts of which can be readily taken apart to be conveniently carried about in a wagon or other vehicle, and the structure being readily built up for work.

Another object of the invention is to provide novel means for actuating the plunger, whereby to give it a relatively fast and gradually decreasing forward movement and a quick return movement for the next operation, the plunger being left in retracted position for a period of time before the next operation to enable the press box to be filled with hay.

A further object of the invention is the provision of novel means for feeding the hay into the press box.

A still further object of the invention is the provision of novel means for closing the mouth of the press box and for effecting the cutting off of the hay when the plunger is advanced.

The invention embodies other improvements and advantageous features to enhance the utility and efficiency of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the improved hay press.

Fig. 2 is a side elevation thereof.

Fig. 3 is an enlarged longitudinal section of the press box, portions being shown in elevation.

Fig. 4 is a cross section taken on the line 4—4 of Fig. 3.

Fig. 5 is an enlarged section on the line 5—5 of Fig. 1.

Fig. 6 is a plan view of the actuating mechanism in position with the plunger advanced while Fig. 1 illustrates the parts in position with the plunger retracted.

The structure, which is of the knock-down type, includes a press box 1 composed of parts which can be readily separated and assembled. The press box 1 is provided with an upper filling hopper 2 from which a trough-shaped feeding table 3 is extended to one side from which the hay is moved into the hopper. A plunger 4 is mounted for reciprocation within the press box and has connected thereto a link or connecting rod 5, said link being connected to the plunger 4 by means of a vertical pivot pin 6. This link 5 is reciprocated for moving the plunger likewise.

The actuating mechanism for reciprocating the link 5 includes an arm 7 extending to one side and upon which the other end of the link 5 is pivoted, as at 6', the arm 7 being pivoted upon a vertical pivot pin 8 extending through a block or bearing 8' carried by a knock-down base frame 9 extending from the bottom of the press box. A link 10 is connected at one end to the pivot 6' and at its other end is pivoted to a second arm 11 fulcrumed to a pivot pin 12 carried by the end of the frame 9, the arms 7 and 11 projecting toward the same side and being oscillated simultaneously by means of the link 10, whereby to reciprocate the link 5.

A lever 13 is fulcrumed between its ends upon the pin 8, and has attached thereto, a tongue or pole 14 forming a part of the lever, said tongue being connected with the lever 13 by means of a brace 15. The lever 13 has rollers 16 at its ends, and the link 5 is provided at that end adjacent to the arm 7 with an abutment or shoulder 17 for the engagement of the rollers 16. An oblique cam member 18 is secured upon the arm 11 in the path of rotation of the rollers 16 with the lever 13. The lever 13 is turned counter clockwise, as seen in Fig. 1, and when one roller 16 strikes the cam 18, it forces the arm 11 away from the press box by a quick movement, thereby pulling the links 10 and 5, to retract the plunger by a similar quick movement. After the roller 16 leaves the cam 18, the plunger remains in retracted position for a period of time, until the roller strikes the abutment 17 of the link 5 which has been moved away from the press box, and the roller 16 in being moved toward the press box will force the link 5 toward the press box to advance the plunger. The roller 16 strikes the abutment 17 when the lever 13 is substantially at right angles to the line of movement of the plunger, and as the link 5 is moved by the roller 16, the lever 13 moves toward and into the line of movement of the plunger, thereby providing for the gradual decreasing speed of the plunger as the pressure increases. The abutment 17 is moved through a curvilinear path, due to the fact that the respective end of the link 5 is connected by the swinging arm 7 to the same fulcrum pin 8 upon which the lever 13 is fulcrumed. When the link 5 is substantially in the line of movement of the plunger, the roller 16 leaves the abutment 17, and the other roller 16 then engages the cam 18 to retract the plunger by a quick movement as above described.

The lever 13 is rotated by a draft animal hitched to a swingle tree 19 connected to the end of the tongue 14, the animal being led around the pin 8 by means of a leader arm 20 extending at an angle from the tongue 14 in advance of the swingle tree. The arm 20 is pivoted, as at 21, to a bracket 22 carried by a U-shaped clamp 23 fitting slidably upon the tongue 14. A pair of clamping bolts 24 are carried by the clamp 23 for clamping the same upon the tongue 14 at various adjusted positions. An arcuate guide rod 25 is carried by the bracket 22 and extends slidably through the arm 20, and a coiled wire expansion spring 26 is disposed upon the rod 25 and is confined between the bracket 22 and arm 20 whereby to yieldably move the arm 20 away from the swingle tree 19 against a nut or stop 27 threaded or otherwise adjustably engaged upon the terminal of the rod 25.

The frame 9 has a transverse supporting bar 28 upon which the link 5 rests for lateral swinging movement as it is reciprocated, and the top of the press box is provided with an opening 29 for giving access to the pin 6, whereby it can be removed upwardly for detaching the link 5 from the plunger.

The device for feeding the hay from the hopper into the press box embodies an arm 30 secured to a transverse rock shaft 31 journaled in bearings 32 which are preferably mounted adjustably upon the press box. An arm 33 is secured to one end of the shaft 31 and is connected by a coiled wire retractile spring 34 with the frame, whereby to raise the arm 30 when it is free to do so. Another arm 35 is secured to the shaft 31 and has a roller 36 in the path of movement of the plunger, the arm 35 being curved toward the plunger. The plunger carries an overhanging contact plate 37 to engage the roller 36 when the plunger is retracted, thereby moving the roller 36 with the plunger and swinging the arm 35 correspondingly, to swing the arm 30 downwardly and move the feeder head 38 downwardly through the hopper into the press box for feeding the hay into the latter. When the plunger is advanced, the plate 37 being removed from the roller 36 brings the spring 34 into play for raising the arm 30.

Dogs 39 are carried by the top and bottom of the frame for holding the hay when compressed by the advance movement of the plunger, the respective end of the plunger having recesses 40 for receiving the dogs whereby they will snap behind the hay to prevent the same expanding back into the press box. The dogs 39 are carried by the upper and lower portions 41 of the guide in which the bales are slidable away from the press box, the portions 41 being of channel-shaped section to guide the bales properly.

A horizontal shutter plate 42 is disposed upon the plunger 4, and said plunger is provided with an upper longitudinal groove 43 accommodating a coiled wire retractile spring 44 which has one end connected to the plate 42 and its other end connected to the plunger 4, whereby to advance the plate 42 with the plunger yieldably. The rear end of the plate 42 has a flange 45 to contact with the plunger when the plunger is retracted, to thereby retract the plate 42 with the plunger. A vertical plate 46 is secured to the press box at the forward side of the mouth thereof, and is provided at its lower edge with a transverse groove 47 formed by bending and doubling the sheet metal. A blade 48 is secured upon the forward end of the plate 42 and is movable into the groove 47 when the plunger is advanced, and before the plunger reaches its foremost position, as seen in Fig. 3. Consequently, when the plunger is advanced, the blade 48 moves into the groove 47 as the plunger is completing its movement, and the plunger in completing its movement will shear off any hay which is caught between the plate 46 and blade 48. The plate 42 will also prevent hay being drawn forwardly between the plunger and top of the press box, the plate 40 being stopped in its movement when it closes the mouth of the press box, while the plunger continues in its movement.

The sides of the bale guide are open between the bottom and top members 41, whereby the tie wires can be readily passed around the bales, and the side of the press box 1 have extensions 49 at their forward ends to project between the grooves 50 of the division blocks 51 which are placed between the bales, whereby the wire can be readily threaded through the grooves 51 between the extensions 49.

The members 41 are resilient, and tend to separate at their free ends, whereby they can be adjusted relatively for controlling the tension on the bales as they are moved through and out of the guide. Transverse bars 52 extend above and below the members 41 and have vertical bolts 53 engaged through their terminals upon which bolts nuts 54 are threaded for forcing the bars 52 toward one another whereby the members 41 are forced toward one another to compress the hay, if this is desired. By loosening the nuts 54, the members 41 will separate. Studs 55 are preferably placed between the bars 52 behind the bolts 53 for limiting the movement of the bars 52 toward one another, whereby to provide a rigid structure.

The lower member 41 is preferably extended rearwardly beyond the upper member, to support the bale as it is ejected, and the end of the lower member 41 has a V-shaped recess 57 to relieve the central portion of said member from pressure under the weight of the bale.

As illustrated in Fig. 4, the press box 1 includes longitudinal corner members 58, and side plates 59 disposed between the corner members 58 and of less thickness than the members 58, and the plunger 44 works between the members 58 out of contact with the plates 59, thereby reducing friction.

The parts of the press box are embraced by clamps 60 somewhat similar in construction to the clamp embodying the parts 52, 53, 54 and 55.

The operation of the hay press, as a whole, is similar to ordinary hay presses, and will be readily understood from the foregoing, which describes the operation of the various devices.

Having thus described the invention, what is claimed as new is:

1. In a hay press, a press box, a plunger working therein, an oscillatory feeder for feeding hay into the press box, spring means for raising the feeder, an arm carried by the feeder and extending toward the plunger, a roller carried by said arm, and a contact plate carried by the plunger to engage said roller when the plunger is retracted for swinging the feeder downwardly.

2. In a hay press, a press box having an upper mouth, a plunger working within the press box and movable under said mouth, a plate mounted slidably upon the plunger and movable under said mouth therewith, a grooved portion carried by the press box at one side of said mouth for the engagement of the forward end of said plate, and spring means for yieldably advancing said plate relative to the plunger.

3. In a hay press, a press box having an upper mouth, a plunger working within the press box, a closure plate upon the plunger to move under said mouth, spring means between said plate and plunger for yieldably advancing said plate with the plunger, a plate carried by the press box at the forward side of its mouth and having a groove, and a blade carried by said plate movable into said groove when the plunger is advanced and before the plunger completes its movement.

In testimony that we claim the foregoing as our own, we have hereto affixed our signatures in the presence of two witnesses.

BEN F. HILTON.
CHARLEY W. HILTON.

Witnesses:
H. W. SNIDER,
S. S. McCRARY.

Copies of this patent may be obtained for five cents each, by addressing the "Commissioner of Patents, Washington, D. C."